Feb. 23, 1971 P. J. WIETRZYKOWSKI 3,564,684
STEPPED CUTOFF BLADE
Filed Oct. 16, 1968

INVENTOR
Paul J. Wietrzykowski

United States Patent Office 3,564,684
Patented Feb. 23, 1971

---

3,564,684
STEPPED CUTOFF BLADE
Paul J. Wietrzykowski, 1617 N. Wood St.,
Chicago, Ill. 60622
Filed Oct. 16, 1968, Ser. No. 768,077
Int. Cl. B26d 1/00
U.S. Cl. 29—95                    1 Claim

ABSTRACT OF THE DISCLOSURE

An improved cutting tool which includes a pair of steps so as to cut metal without leaving a wall scouring.

---

This invention relates generally to cutting tools. More specifically it relates to a cutting blade.

It is generally well known to those skilled in metal machine shop practice that when a straight cutoff blade is used in cutting metal that a wall scouring will often occur. This is of course objectionable and in want of improvement.

Accordingly it is a principal object of the present invention to provide a cutoff blade having self-contained means so as to prevent wall scouring when cutting metal.

Another object of the present invention is to provide a cutoff blade which includes a pair of steps so that the cutting operation is performed in two steps, thereby eliminating the possibility of wall scouring.

Yet another object of the present invention is to provide a stepped cutoff blade wherein a first step is cut, the resulting chips are then lifted up and forced over on top of chips being cut with a second step.

Other objects of the present invention are to provide a stepped cutoff blade which is simple in design, inexpensive to manufacture, rugged in construction, easy to use and efficient in operation.

These and other objects will be readily evident upon a study of the following specification and the accompanying drawing wherein.

Figure 1:
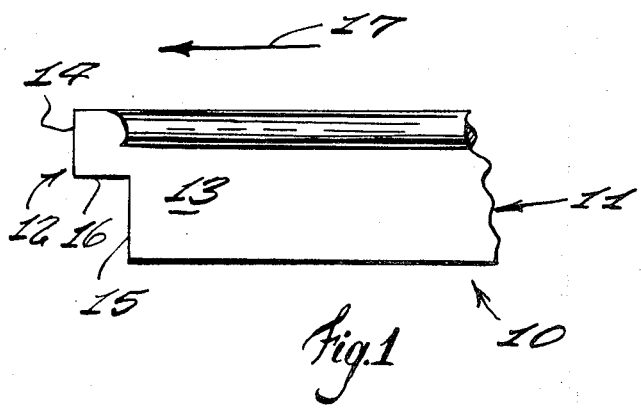
FIG. 1 is a top plan view shown fragmentarily of the stepped cutoff blade.
Figure 2:
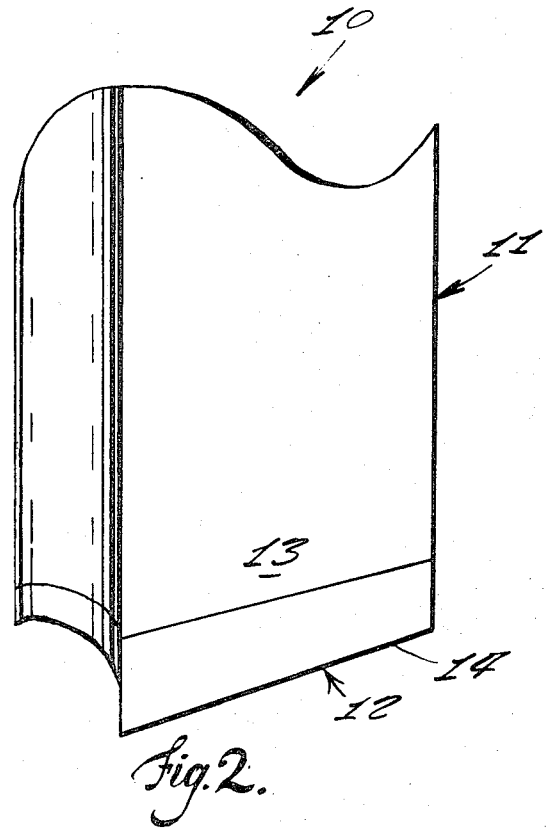
FIG. 2 is a side perspective view thereof.
Figure 3:
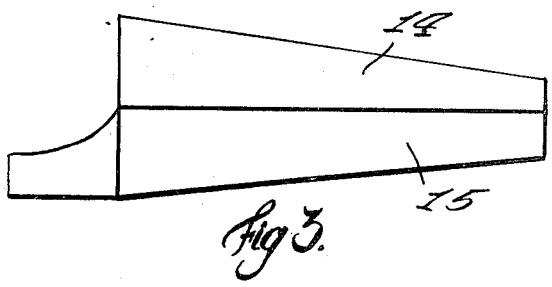
FIG. 3 is a front elevation view of the present invention.

Referring now to the drawing in detail, the reference numeral 10 represents a stepped cutoff blade according to the present invention wherein there is a blade body 11 having a cutting edge 12 at one end 13 of the body, the cutting edge 12 being divided into a first step 14 and a second step 15. As shown in FIG. 1 of the drawing, the first step 14 is in spaced relation to the second step 15 by means of a perpendicular wall 16 therebetween.

In operative use, the stepped cutoff blade is moved in the direction as is indicated by the arrow 17 in FIG. 1. The tool works by feeding in and cutting with the first step, lifting the resulting chips up and forcing it over on top of chips being cut with the second step.

The advantage of this two step cutting is that it will prevent wall scouring that is common with the straight cutoff blades conventionally used in machining operations. Therefore with little scouring in evidence, the infeed can be increased in speed, deeper cuts may be possible, and more difficult materials can be machined.

Thus there has been provided a cutoff tool used in machining operations as the last sequence in metal parts production.

While various changes may be made in the detailed construction, it is understood that such changes will be within the spirit and scope of the present invention as is defined by the appended claim.

I claim:

1. In a cutoff blade used in metal machining operation, the combination of a blade body, said blade body having cutting edge means located at one end of said blade, said cutting edge means being able to cutoff metal and prevent wall scouring such as commonly occurs with a straight cutoff blade, said cutting edge means comprising a cutting edge comprised of a first step and a second step, said first step and said second step comprising individual cutting edges which are parallel to each other and in spaced relation by means of a perpendicular wall between and which extends between the ends of said steps comprising said individual cutting edges.

References Cited

UNITED STATES PATENTS

| | | | |
|---|---|---|---|
| 169,913 | 11/1875 | Martin | 29—95 |
| 2,713,714 | 7/1955 | Krause | 29—95 |
| 2,891,300 | 6/1959 | Shephard | 29—95 |
| 2,932,083 | 4/1960 | De Nicolo | 29—95X |
| 3,320,653 | 5/1967 | Shephard | 29—95 |

FOREIGN PATENTS

| | | |
|---|---|---|
| 810,512 | 3/1959 | Great Britain. |
| 320,274 | 4/1920 | Germany. |

HARRISON L. HINSON, Primary Examiner

U.S. Cl. X.R.

29—97